US011315127B2

(12) United States Patent
MacDonald-Korth et al.

(10) Patent No.: US 11,315,127 B2
(45) Date of Patent: Apr. 26, 2022

(54) STANDARD SYSTEM AND METHOD FOR ASSIGNING RATINGS TO ART MATERIALS AND WORKS OF ART BASED ON THE PROJECTED STABILITY OF THE CONSTITUENTS

(71) Applicants: Emily M. MacDonald-Korth, AuGres, MI (US); James W. Korth, Miami, FL (US)

(72) Inventors: Emily M. MacDonald-Korth, AuGres, MI (US); James W. Korth, Miami, FL (US)

(*) Notice: Subject to any disclaimer, the term of this patent is extended or adjusted under 35 U.S.C. 154(b) by 544 days.

(21) Appl. No.: 16/356,797

(22) Filed: Mar. 18, 2019

(65) Prior Publication Data

US 2019/0213603 A1    Jul. 11, 2019

Related U.S. Application Data

(63) Continuation of application No. 14/796,634, filed on Jul. 10, 2015, now abandoned.

(Continued)

(51) Int. Cl.
*G06Q 30/00* (2012.01)
(52) U.S. Cl.
CPC ................. *G06Q 30/018* (2013.01)
(58) Field of Classification Search
CPC combination set(s) only.
See application file for complete search history.

(56) References Cited

U.S. PATENT DOCUMENTS

| 4,899,392 A | 2/1990 | Merton |
| 5,911,131 A | 6/1999 | Vig |

(Continued)

FOREIGN PATENT DOCUMENTS

| KR | 20130141403 A | 12/2013 |
| WO | 01/82263 | 11/2001 |
| WO | 2013/165583 | 11/2013 |

OTHER PUBLICATIONS

Hunter, J. and Odat, S., "Building a Semantic Knowledge-Base for Painting Conservators" [online], 2011 Seventh IEEE International Conference on eScience, pp. 6-7 [retrieved on Dec. 7, 2021], Retrieved from the Internet: https://ieeexplore.ieee.org/stamp/stamp.jsp?tp=&arnumber=6123275 (Year: 2011).*

(Continued)

*Primary Examiner* — Lynda Jasmin
*Assistant Examiner* — Ehrin L Pratt
(74) *Attorney, Agent, or Firm* — Rebecca A. Tie; Gregory L. Mayback; Dickinson Wright PLLC

(57) ABSTRACT

Computer-powered system for determining a stability rating of an artwork piece, comprising a server, network, computer database(s) containing data regarding preservation-effecting factors and sub-factors and relating the factors and sub-factors to other pieces of artwork of various types, wherein data contained within the database forms a dynamic and searchable catalog of records of artwork pieces, at least one computing device having a software application stored therein that receives data from a user pertaining to queries about the artwork piece based on the examination of and research about the artwork and transmits the data to the network; the server applies algorithmic computations to the received data to convert it into representative grades for each factor and sub-factor and calculate a stability rating, wherein the stability rating represents the projected stability of the artwork and the resulting grades and stability rating are dependent upon the entire body of data within the database(s).

8 Claims, 8 Drawing Sheets

Related U.S. Application Data

(60) Provisional application No. 62/024,697, filed on Jul. 15, 2014.

(56) References Cited

U.S. PATENT DOCUMENTS

| | | |
|---|---|---|
| 6,038,554 A | 3/2000 | Vig |
| 6,070,160 A | 5/2000 | Geary |
| 8,380,602 B2 | 2/2013 | Lutnicj et al. |
| 2006/0271501 A1 | 11/2006 | Mazzella et al. |
| 2007/0131144 A1 | 6/2007 | Winter et al. |
| 2008/0235111 A1 | 9/2008 | Dotan |
| 2010/0089160 A1 | 4/2010 | Cosentino |
| 2011/0022542 A1 | 1/2011 | Lutnick et al. |
| 2012/0023435 A1 | 1/2012 | Kneppers |
| 2012/0124058 A1 | 5/2012 | Wachtel |
| 2013/0041721 A1 | 2/2013 | Neuendorf |
| 2013/0317930 A1 | 11/2013 | Lutnick et al. |

OTHER PUBLICATIONS

International Search Report and Written Opinion of PCT/US15/40585 dated Oct. 7, 2015.

Jane Hunter, "Building a Semantic Knowledge-Base for Painting Conservators", 2011, pp. 173-179, downloaded from https://ieeexplore.ieee.org/stamp/stamp.jsp?tp=&arnumber=6123275 (Year: 2011).

* cited by examiner

FIG. 6

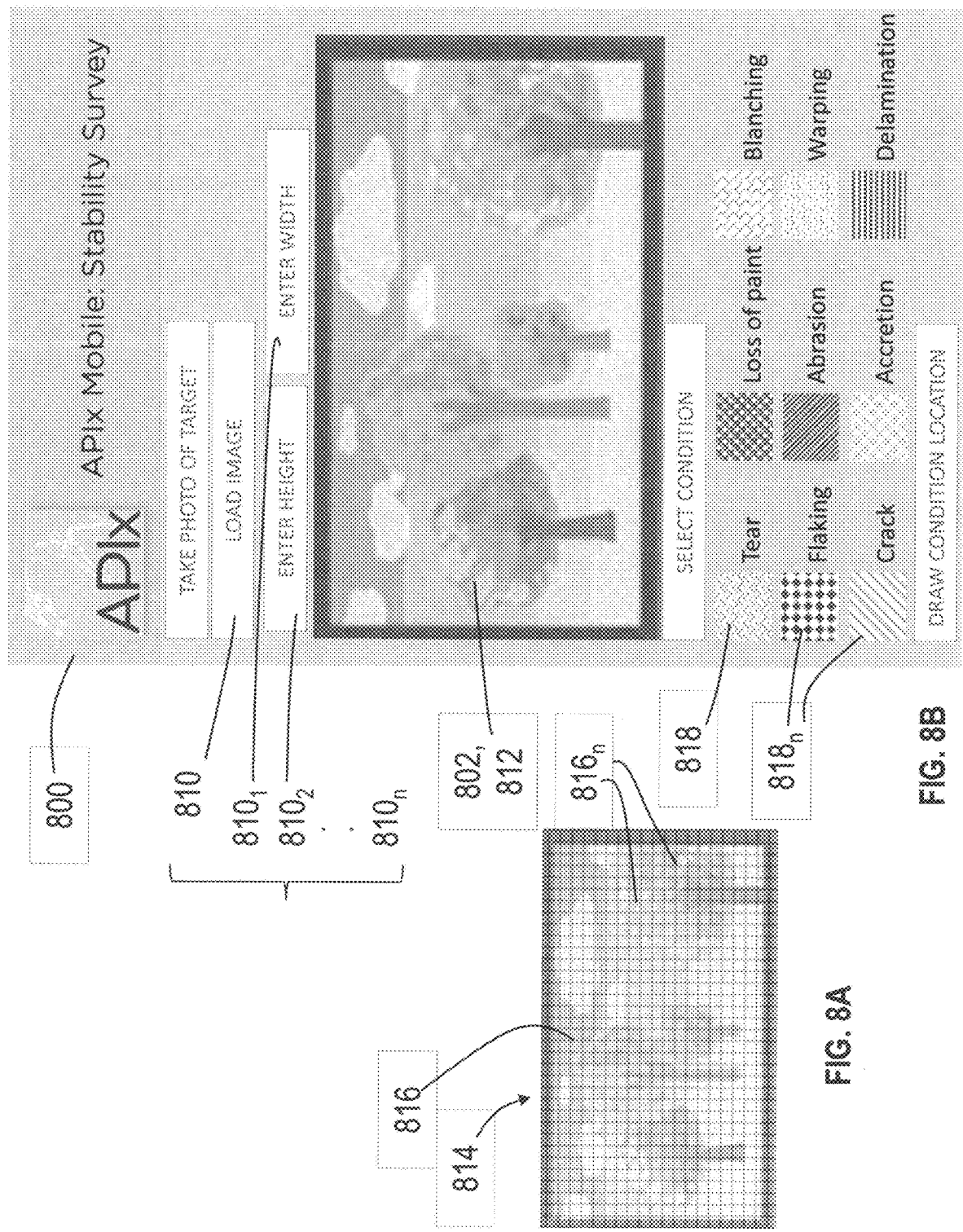

STANDARD SYSTEM AND METHOD FOR ASSIGNING RATINGS TO ART MATERIALS AND WORKS OF ART BASED ON THE PROJECTED STABILITY OF THE CONSTITUENTS

CROSS-REFERENCE TO RELATED APPLICATIONS

The present application is:
a continuation of U.S. patent application Ser. No. 14/796,634, filed on Jul. 10, 2015, which application:
claims the priority, under 35 U.S.C. § 119, of U.S. Provisional Patent Application Ser. No. 62/024,697, filed on Jul. 15, 2014,
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention lies in the field of rating art. The present disclosure relates to a technology-based standard-setting system and method for assigning ratings to art materials and works of art based on the projected stability of the constituents.

BACKGROUND OF THE INVENTION

Works of art are complex composite objects, commonly made from multiple materials such as paint on canvas, a sculpture constructed from wood and manufactured elements, or a collage made from bits of paper or cloth adhered to a board. Many works of art, even those that are purchased for millions of dollars, will deteriorate in just a few years. Nearly all materials used to make art (which includes nearly all materials in existence) will degrade or deteriorate over time, but the type and rate of degradation and/or deterioration depends greatly on the materials themselves and their interactions with other materials in an art object and its storage environment. More recent art is often made from materials that are not intended for use as permanent and stable art materials (resistant to degradation), and are instead made to be ephemeral and/or disposable (e.g., newspaper, fragments from single-use plastic containers, or low-quality paint and inks, etc.). Some types of plastics, for example, self-destruct if kept in a closed container; others are stable with little to no protective measures (in normal environments).

Most persons in the art world have no knowledge of the materials used to make individual works of art and if they do, they do not have an understanding of how the materials perform. The character of materials used to make art, and the interactions between these materials and their storage and display environments, are currently largely unknown to most art professionals and the general public. However, scientists and preservation experts have carried out and continue to carry out, extensive research on materials and their environments, and this information can be used to interpret and project the long-term stability and preservation implications of art materials and works of art.

Financial rating agencies have been rating investments for the likelihood of repaying loans since the early $20^{th}$ century. Building construction materials are rated for strength and stability. Like homes, artwork may be made of materials that will degrade quickly without proper care, and in some situations, will self-destruct over relatively short time spans.

Despite the fact that many works of art cost more than an average home, no standard stability ratings currently exist in the art world. Presently, a piece of art could be sold at a gallery or at auction for substantial sums and, unknown to the buyer or the seller, the materials by which it is constructed might negatively interact with one another or simply deteriorate independently in just a few years, consequently devaluing the piece substantially. Also, art in a deteriorated condition is often treated to improve appearance with methods that may add to its deterioration over time rather than improve its stability. Projected standard ratings would help art owners, art conservators, and all participants in the art world make better plans for the stabilization of art objects.

Stakeholders in the art market purchase, finance the purchase of, and insure works of art based on a monetary appraisal. However, current monetary appraisal methods for artwork do not consider the material from which the object was made or how those materials will change over time. For example, there are known problems with some of the biggest-ticket artworks on the market, and consistent issues with the stability of works from major artists. At this time, stakeholders in the art world do not have a gauge for measuring the stability of art investments, which leads to uninformed purchases, transactions, and underwriting. An unstable work of art is an unstable art investment. This relationship is a direct one. It is important that stakeholders are aware that much of the artwork sold will not endure for more than a few decades, if not for considerably less time.

Overall, it would be desirable to have a standard system and method for computer-aided rating of art materials and works of art based on the projected stability of the constituents. It would be desirable for an insurer, appraiser, seller, consumer, and general public to have a system whereby preservation facts are easily accessible and understandable so that informed investment decisions can be made.

Thus, a need exists to overcome the problems with the prior art systems, designs, and processes as discussed above.

SUMMARY OF THE INVENTION

The invention provides a technology-based standard-setting system and method for assigning ratings to art materials and works of art based on the projected stability of the constituents that overcome the hereinafore-mentioned disadvantages of the heretofore-known devices and methods of this general type and that provide such features with a computer-aided system and method for calculating a stability rating for art materials and works of art based on the projected stability, or longevity, of their parts or constituents. The basic steps of the rating method include providing a rating structure of a multiplicity of stability-effecting factors, where each factor is further divided into a plurality of sub-factors, each assigned a grade and/or weight, and establishing a database of all known materials and circumstances that affect material degradation.

In this context, stability refers to a quality of resistance to unfavorable change. The rating system uses multi-level analytical assessments, employing proprietary survey techniques, to collect quantitative and qualitative data. The data will be entered into a technology-based system and compared to a database of information containing scores for each preservation-effecting factor and the system calculates a standard rating. Each constituent or group of constituents, combined to make an art material or work of art, will be assessed individually, by category and subcategory/ies. Analytical assessments will identify, at least and not limited to, the constituents of the art material or work of art, its construction and the materials and techniques employed in doing so, how those materials age, the interactions between constituents and their interactions with the environment, the known preservation concerns for such constituents, the current condition of the object and conservation work that may be needed, the complexity of care required for the object to be preserved in the long term, and the quality of data sources used in the assessment of the art material or work of art. This is not intended to be an exhaustive list or to exclude other factors that may be contemplated and added to the list. The standard rating, a numeric score, will be derived from calculations based on data that is collected during examination and analysis, as assessments are carried out, and then compared to values in the database. Every art object will be assessed in the same standard manner.

The qualities of art materials and works of art are central to their stability over time. Some materials may begin to disintegrate almost immediately while others may remain stable for centuries. The combination of materials and their interaction with one another may also add or detract from long-term stability. The invention is a standard rating system for art materials and works of art based on the projected stability, or longevity, of its matrix of constituents. As mentioned above, oftentimes art works are purchased or restored with little knowledge of the projected stability of an artwork over time. This rating system gives all participants in art creation and distribution a more standardized method to evaluate the longevity potential of each artwork or material.

In essence, the invention provides for the ability to evaluate works of art, predict the longevity of the materials from which they were made, and give an objective assessment of their stability. The invention allows for the ability to quantify the previously unquantifiable and to give an alphanumeric rating that reflects the stability of each piece of art. As a result of the invention, the acts of investing, insuring, and financing art will become much safer due to the consideration of a factor that has never before been measured during the appraisal process—namely, a degradation coefficient. The concept of a degradation coefficient has never before been considered in any valuation models of artwork and, therefore, current valuation models are incomplete due to their lack of consideration of the materiality of an object and how that materiality will change over time. The present invention improves the accuracy of material object evaluation.

The stability ratings are generated by multi-layer assessments of artworks in situ to evaluate the materials, their application, and the way they interact chemically and physically. According to the invention, a substantial number of data points (for example, an average of 60 data points) are collected in situ and transmitted to one or more servers and stored in a database and compared to pre-determined values in the database to then be run through the computerized algorithm, which comprises a series of formulas, to generate the rating. Thus, an intense development was used to create this complex ratings system.

In addition, as described in detail below, each time an assessment of a work of art is performed and a stability rating is calculated for that work of art using the system and database(s) of the present invention, a record of that work of art that includes its bibliographical information, the data points collected during its examination, and the results of the numeric or alphanumeric calculation and scoring is necessarily created and stored in the system such that, over time, the database(s) of the system act to catalogue works of art from around the world and on a grand scale to create a central reference of works of art. As a result, many works of art that might otherwise never have been recorded in any location can now be documented. Furthermore, various levels of access to this reference source provides users with the ability to search for a work of art, view its material constituents and the condition of those constituents as documented by an expert, and to see the rating results of the rating system of the present invention. Accordingly, the central reference source created by the system and database(s) of the present invention is continuously evolving in real-time and in a dynamic manner, and relies upon the input of the users across the world. Therefore, this type of central reference cannot be accomplished by any other type of institution or publication, or in the human mind using a pen and paper, as the knowledge of any such institution or author of such a publication would undoubtedly be limited in scope to just the works of art to which that particular institution or author is exposed. Also, as described below, the data that is gathered and stored in the system database(s) is used in the computations to determine the numerical or alphanumerical rating of works of art. Accordingly, as the sheer volume of data in the database(s) expands, the rating determination becomes more refined. As such, the processing and computation of the computerized system of the present invention is improved over time by the nature of the computer-powered data-gathering processes, database(s), and statistical analysis processes of the present invention.

Although the invention is illustrated and described herein as embodied in a standard system and method for assigning ratings to art materials and works of art based on the projected stability of the constituents, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 6 is a flow chart showing an example of the steps in the method of value selection for the groups of factors and sub-factors that determine the rating in accordance with an exemplary embodiment of the system of the present invention;

FIG. 8A is a depiction of a grid underlay generated and used by an exemplary embodiment of a software application of the system of the present invention to gather area data points of a work of art; and FIG. 8B is a schematic view of an automated surface area quantification survey page of a graphical user interface depicted on a mobile computing device in accordance with an exemplary embodiment of the system of the present invention.

DETAILED DESCRIPTION OF THE INVENTION

Figure 1:
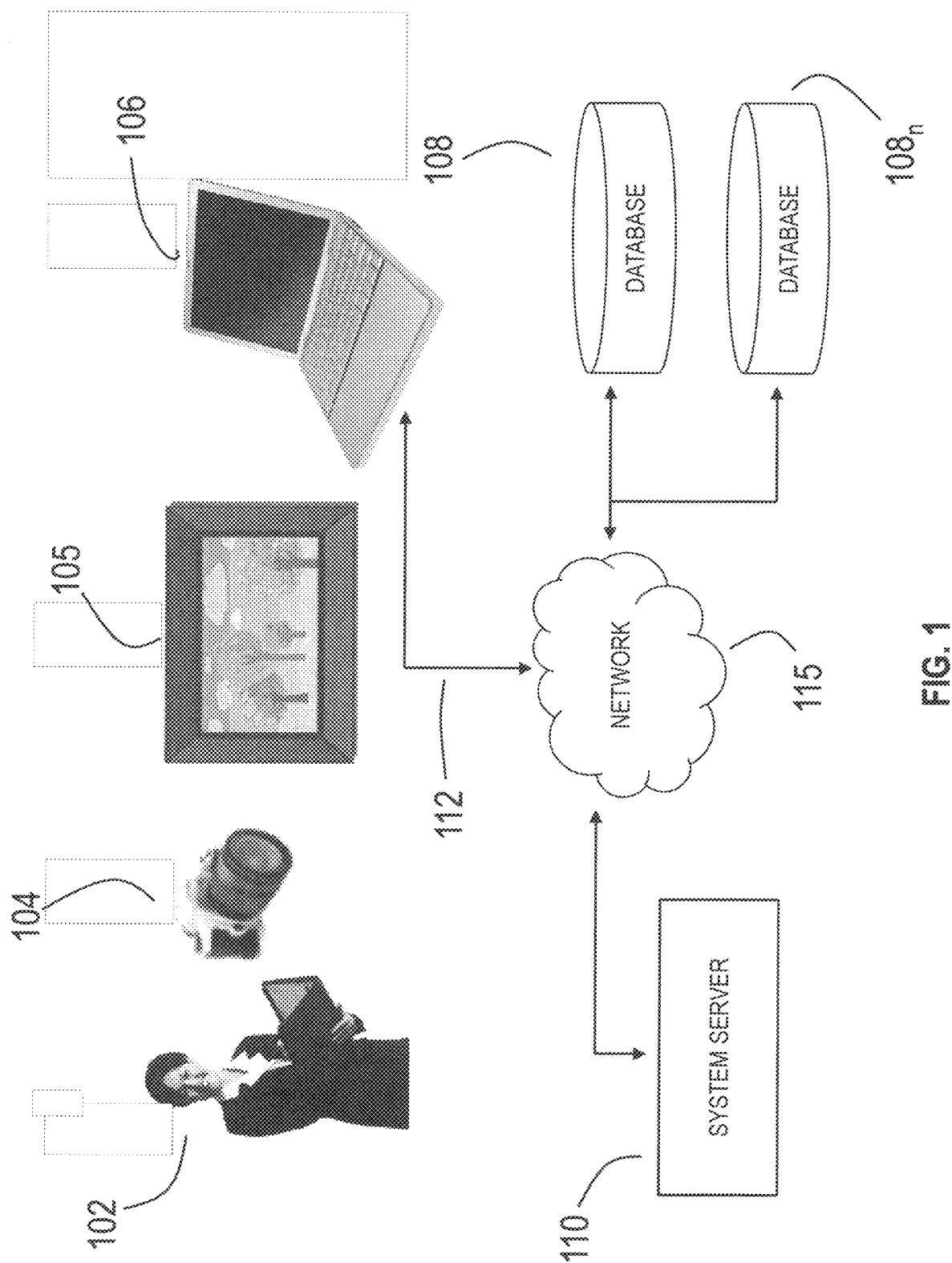
FIG. 1 is an illustration of the major system components of a computer-aided rating system in accordance with an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

It will be appreciated that embodiments of the invention described herein may be comprised of one or more microprocessors and unique and specialized stored program instructions that control the one or more microprocessors to implement, in conjunction with certain non-processor circuits and other elements, some, most, or all of the functions of the invention described herein. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of specialized instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of the major components of the computer-aided rating system. As set forth in detail below, the ratings system is powered by technology through the use of novel algorithms, specialized software applications, and one or more specialized master databases that prior to the invention, did not exist.

The system involves an operator 102 that examines and photographs, with camera 104, the target art object or material 105, and, through the use of a computing device 106, accesses one or more databases 108, $108_n$ (whereby the subscript number "n" could be any number greater than 1) of preservation-effecting factors and sub-factors and associated information about these factors. Databases 108, $108_n$ may be accessed through servers 110. The computing device 106 communicates with the one or more servers 110 using a wired or wireless connection 112 and network 115. The target art object or material will be referred to as "Target" from this point forth. In the description that follows, a painting is primarily used as an example of a target object for purposes of describing the present invention. However, it should be understood that the present invention may be applied to all media types by taking into consideration different stability-effecting factors and sub-factors. For example, other media types may include photographs, prints, drawings, sculptures, decorative arts, architecture, furniture, automobiles, jewelry, ethnographic objects, archaeological objects, books, collectible objects, etc. Computing device 106 may comprise any device that is capable of executing a software application with memory and processing components of the device, receiving and transmitting data in real time across an Internet network, and displaying to an operator a graphical user interface according to the software application. Such devices may include, but are not limited to, mobile devices, tablets, personal computers (PCs), or any other type of computing device. It is also envisioned that operators can access the ratings system's server(s) 110 and database(s) 108, $108_n$ through a dedicated website that may be accessed using any Internet-accessible device. Alternatively, a downloaded version of the system's database(s) 108, $108_n$ may be stored on the operator's computing device.

Figure 2:
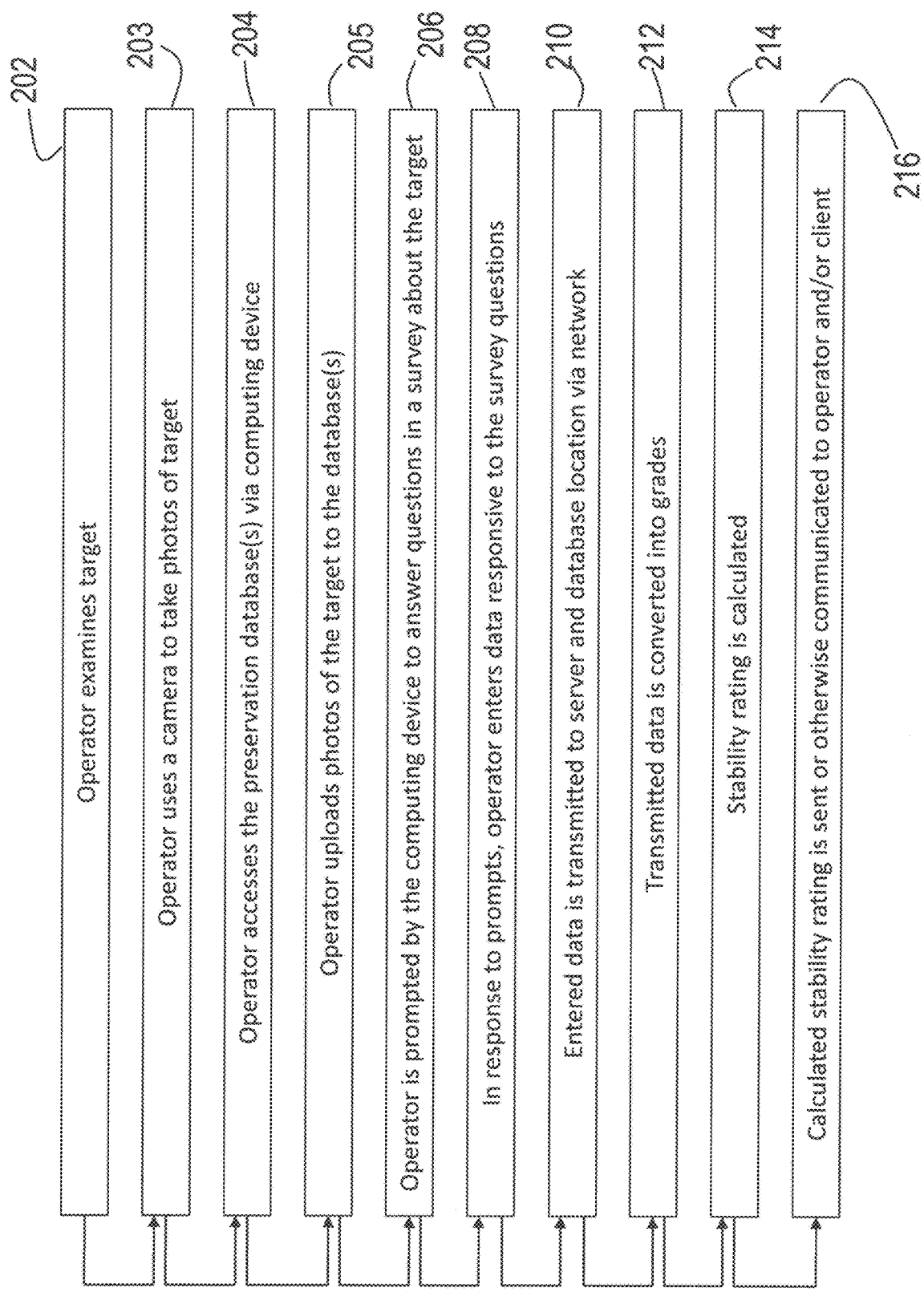
FIG. 2 is a high-level block diagram illustrating the steps of a computer-aided rating method utilized in accordance with an exemplary embodiment of the present invention.

FIG. 2 is a general illustrative block diagram of the computer system utilized in the present invention. In Step 202, the operator examines the Target using tools of examination. Tools of examination could be non-invasive whereby they are used to study the Target without sampling, such as magnification and ultraviolet light illumination. Alternatively, or additionally, the tools of examination could be invasive whereby they are used to study the Target by sampling and analyzing the sample, utilizing techniques of analysis such as cross-sectional optical microscopy, and molecular and elemental analyses. As fine art is a complex system with many layers of materials to assess, the process is complicated and can only be performed by an expert. As such, the operator 102 can be a trained art preservation professional (e.g., an Art Preservation Index ("APIx") Certified Field Conservator). Furthermore, all ratings resulting from the system of the present invention will be based on the specification that the art material or work of art will be stored and exhibited in standard levels of temperature, relative humidity, and light (as defined in the literature).

In Step 203, the operator uses a camera to take pictures of the Target. The operator takes as many photos as necessary to fully document the Target (photodocumentation methods used herein are based on the guidelines set by the American Institute for Conservation, for example). In Step 204, the operator uses the computing device 106 to access the database(s) 108, $108_n$ of preservation-effecting factors and sub-factors and associated information about these factors, via the Internet or a downloaded version of the database(s) on the operator's computing device 106, hard drive, or other data storage device. In Step 205, the operator uploads the photos of the Target into the database(s). In Step 206, the operator is prompted by the computing device 106 to answer questions about the Target. In Step 208, the operator responds to prompts based on examination of and research into the Target. During this survey, the operator may be required to answer more than 100 questions about how the Target object was made, its current condition, and its exhibition and storage history. This results in the collection of more than 100 data points about the Target object.

Figure 7:
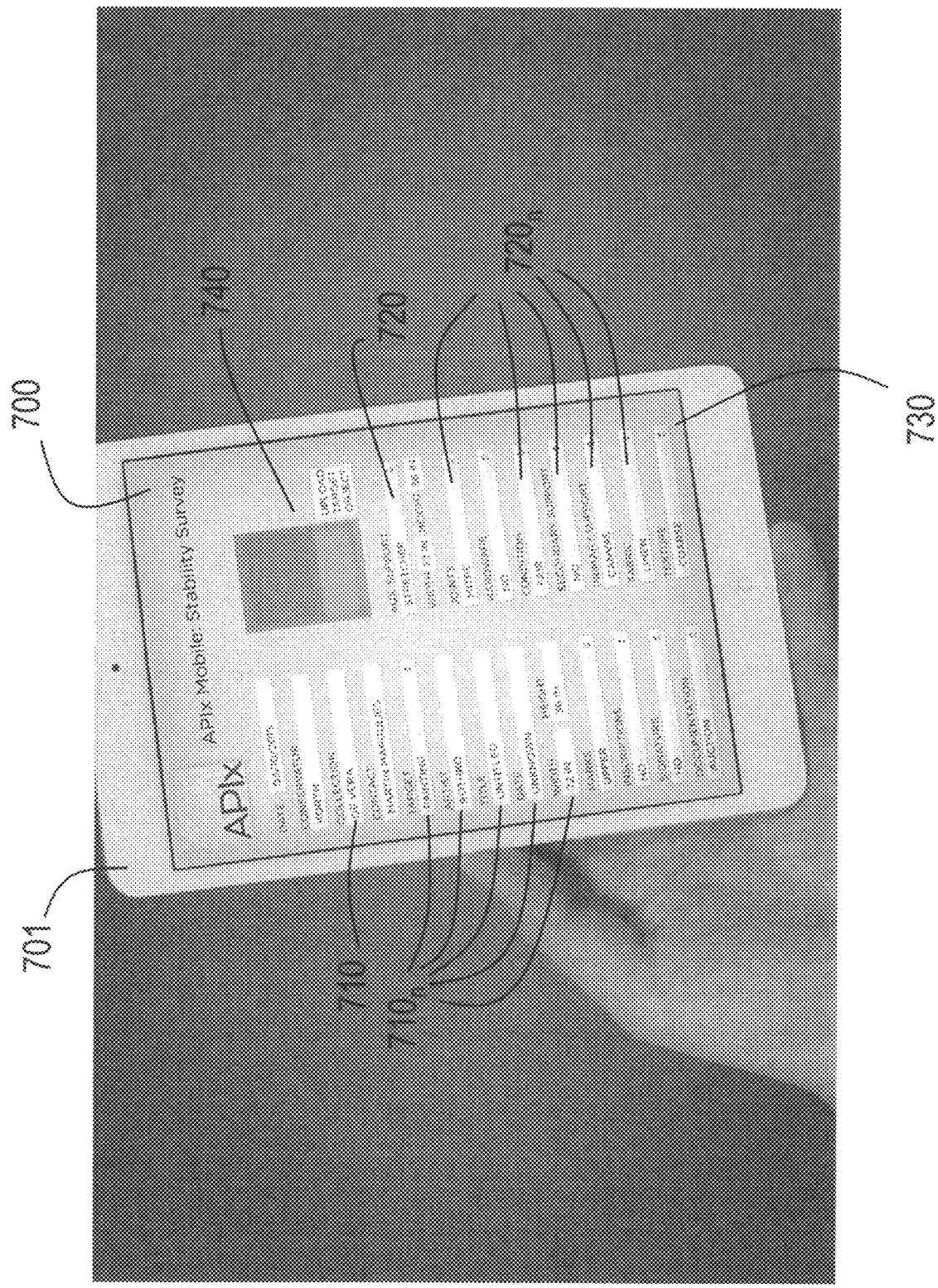
FIG. 7 is a schematic view of a survey page of a graphical user interface depicted on a mobile computing device in accordance with an exemplary embodiment of the system of the present invention.

As mentioned above, in order for the operator to access the database(s) 108, $108_n$ and server(s) 110 via network 115 to accomplish the examination and information gathering and entry steps described above, the operator interacts with a specialized graphical user interface according to a software application of the present invention. In FIG. 7, there is depicted an exemplary embodiment of a graphical user interface 700 in accordance with the present invention. In this particular depiction of the graphical user interface, a survey page of the graphical user interface is shown in which there are a plurality of data entry fields that are provided to the operator for the compilation and storage of the data points obtained through the examination of the Target object. For example, one or more of the data entry fields 710, $710_n$ (whereby the subscript number "n" could be any number greater than 1) may prompt the operator to enter the bibliographical information about the Target object. Such data entry fields may include, but are not limited to, the name of the artist, the title of the Target object, the date on which the Target object was created or completed, and the dimensions of the Target object. Other data entry fields 720, $720_n$ (whereby the subscript number "n" could be any number greater than 1) may prompt the operator to enter tangible information related to the material constituents and the current physical condition of the Target object. Such data entry fields may include, but are not limited to, the type of auxiliary support, the type of secondary support, the type of primary support, the type of fabric, and the type of joints present in the Target object. Furthermore, to increase the efficiency of the surveying process and to normalize or standardize the terms of art used to characterize the physical aspects of the Target object, some data entry fields 700 may provide drop down selection menus that require the operator to limit his or her entry to one of the choices provided in the menu. For example, with respect to the "texture" of fabric support of the Target object, a drop down selection menu 730 may be provided to limit the operator's choices to just that of "very smooth," "smooth," "regular," "coarse," and "very coarse," etc. In addition, the graphical user interface 700 may provide one or more fields 740 in which the photograph(s) taken by the operator of the Target object can be uploaded and stored in database(s) 108, 108$_n$. FIG. 7 depicts an embodiment of a single exemplary screen or page of the graphical user interface 700 as it might appear to the operator when used in connection with a mobile computing device 701. The portable nature of the mobile computing device 701 is an especially convenient form as it allows the operator to conduct the survey directly from the field and from the precise location of the Target object. Whereby the operator collects the data using a variety of non-invasive methods such as visual examination, magnification, surface microscopy, ultraviolet light examination, raking light examination, and high-resolution photography, all of these methods require other equipment to be handled and carried to the location of the Target object. Accordingly, the mobile capability of the present invention is of particular importance because, in the most ideal circumstance, the operator (e.g., examiner or field conservator) must be able to examine the Target object in situ and the data should be transferred instantly to database(s) 108, 108$_n$ for purposes of accuracy and efficiency, safety to the target object (as it will not need to be moved from its existing location), and convenience to the end-client. Most damage to an art object occurs during its transit.

In addition to the conventional tools and methods available for the examination of artwork, use of the software application of the present invention as an examination tool is also contemplated to be within the scope of the invention. For example, the software may be specially programmed and configured to use the photographic or other types of images of the Target object to measure the surface area of the object, and other physical characteristics or parameters, to more accurately and quickly gather area data points. FIGS. 8A and 8B depict just one exemplary embodiment of a computer software application according to the present invention that generates a surface area quantification of a Target 802. In FIG. 8B, there is shown an exemplary surface area quantification survey page 800 of the graphical user interface 700 as it might appear to an operator when used in connection with a mobile computing device 701. Using this survey page 800, the operator enters specific data about Target 802 into a number of data entry fields 810, 810$_n$ (whereby the subscript number "n" could be any number greater than 1), which data is then utilized by the software application to produce an automated surface area quantification. In this particular example, the photograph(s) that are taken by the operator of the Target object 802 are uploaded into the software application via the data entry field 810 and one or more images 812 are produced. In addition, the dimensions of the Target object 802 (e.g., height and width) are entered into the system via data entry fields 810$_1$ and 810$_2$. Thereafter, using the dimensions of Target 802, the software application calculates the total surface area of Target 802 and places a "grid underlay" 814 made up of "cells" 816, 816$_n$ (whereby the subscript number "n" could be any number greater than 1) under the image 812, as shown in FIG. 8A. Each cell 816, 816$_n$ represents a certain percentage, "n %" (whereby the number "n" can be any number greater than zero), of the total surface area of Target 802. The size of the cells 816, 816$_n$ can be defined by the operator. Subsequently, during the examination of the Target 802, the operator can use the "grid underlay" 814 to electronically "map" the various conditions of the Target 802. For example, the survey page 800 provides the operator with several "condition types" 818, 818$_n$ (whereby the subscript number "n" could be any number greater than 1) from which the operator can select to describe any conditions that may be found in Target 802. In this particular example, these selectable condition types 818, 818$_n$ include, but are not limited to, a "tear," "flaking," a "crack," "loss of paint," "abrasion," "accretion," "blanching," "warping," and "delamination." Once a condition type is selected by the operator, the operator electronically indicates the area of Target 802 where that particular condition type is located by "outlining" the condition type on the corresponding area in image 812. This outlining operation can be performed by the operator using any suitable input mechanism of device 700, such as a mouse or touch screen, or using a graphics tablet. In response to the outlining or drawing on the image 812, the software application of the present invention automatically selects the cells 816, 816$_n$ of the grid underlay 814 that directly correspond to the outlined area of image 812. The outcome of using the grid underlay 814 is captured as "x %" of condition type 1, "y %" of condition type 2, "z %" of condition type 3, etc. (whereby the numbers "x", "y", "z", etc., can be any number greater than zero). In addition, the software application may generate a list of all condition types indicated by the operator, the percentage of surface area of each condition type, and the corresponding locations on image 812 of each condition type, as well as a graphical map of the surface area of Target 802 that depicts the location of each and all conditions.

Returning now to FIG. 2, in Step 210, the data that is entered by the operator is transmitted to the server and database location via network 115. In Step 212, as described in further detail below, these data points (i.e., algorithm inputs) are automatically compared, within the server, to the pre-determined and stored values for each data point or combination of data points within the database(s) 108, 108$_n$ in order to convert the data into grades for each sub-factor and factor.

Thereafter, as described in further detail below, a rating is calculated, at the server and database location, from the grades for each factor whereby the values or grades for each data point or combination of data points is applied to a complex, multi-part algorithm. In one exemplary embodiment of this algorithm, a series of weighted sum and weighted mean formulas are applied to approximately 60 factors per evaluation, which results in the calculated stability rating. See Step 214. Accordingly, in view of the massive amounts of data and the large number of applied computations, the ratings system requires the use of a non-human computing device in order to provide a valuable rating that is useful to the industry as a whole. It would be impossible for a human mind, with or without the aid of pencil and paper, to have stored in its memory the massive amount of data upon which the rating is based and to carry out the necessary data comparison and calculations between tens of thousands (or more) of entries within the database(s) 108, 108$_n$ on server(s) 110. One could not arrive at the rating without utilizing the entire massive bank of data stored in database(s) 108, 108$_n$ as the rating itself is dependent upon this data. It is impossible for the human mind, with or without the aid of pen and paper, to be able to store and recollect such large amounts of data and perform computations that take into account the entire data bank, such as statistical analysis.

In Step 216, the rating is transmitted to the operator 102. This rating may be communicated to the operator by, for example, a rating report and a Stability Rating Certificate that includes the numeric or alphanumeric rating (which is a translation of the entire stability calculation into a standardized grading scale) to communicate the information more effectively to the operator and end-client. The Stability Rating Certificate may be transmitted to the recipient in a hard copy paper document and/or in electronic form. In addition, similar to a title document establishing the ownership of an article, this certificate may attach to its associated Target object for the life of the Target object such that it is transferred with the Target object along with ownership.

Figure 3:
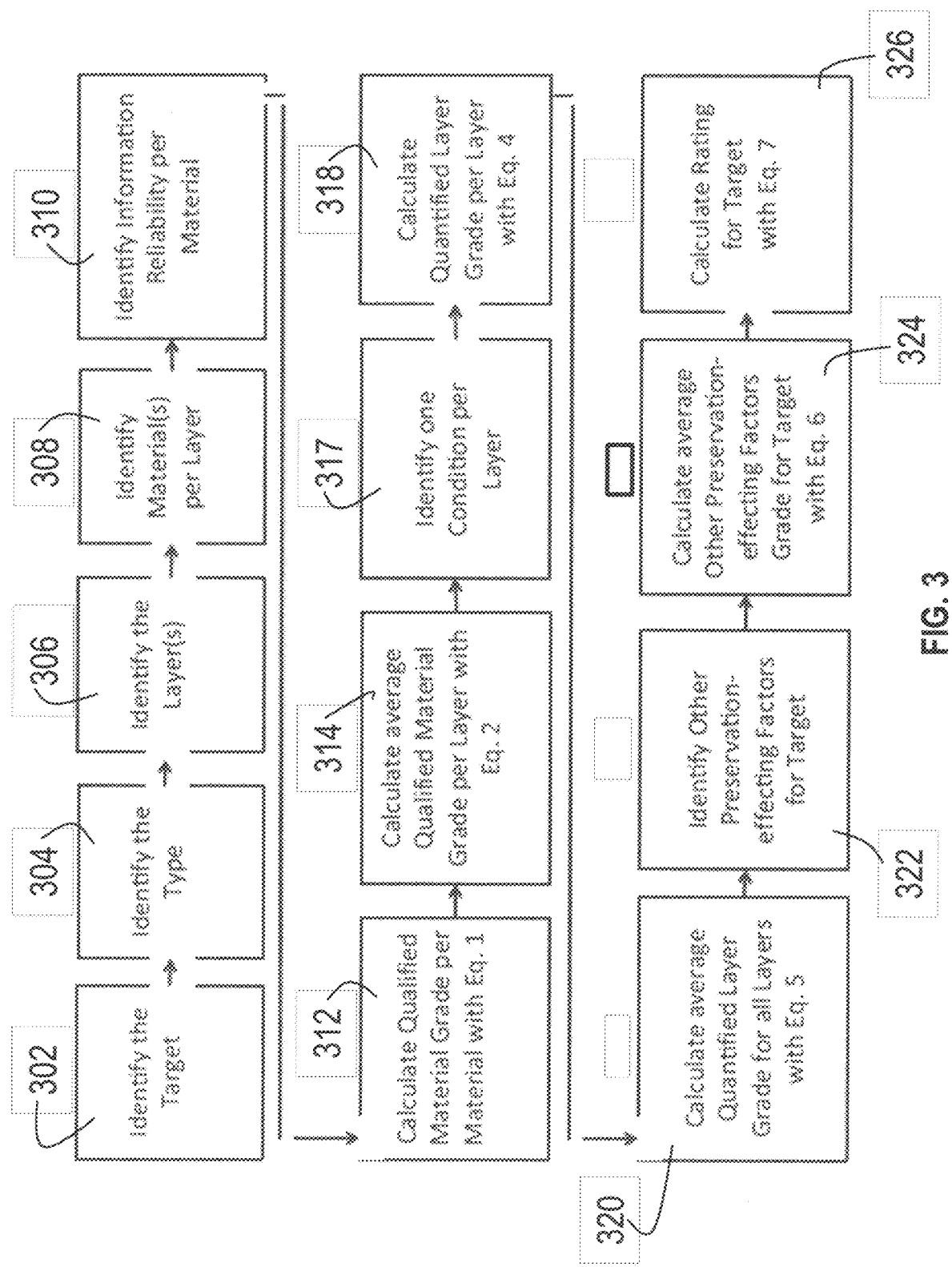
FIG. 3 is a block diagram illustrating the grading steps of a computer-aided rating method utilized in accordance with an exemplary embodiment of the system of the present invention.

Now referring to FIG. 3, it is a high-level block diagram that illustrates the grading steps of a computer-aided rating method that are utilized in accordance with an exemplary embodiment of the system of the present invention. In Step 302, the operator identifies the Target and enters identifying bibliographical information such as the artist, date of completion, title, and dimensions into database(s) 108, 108$_n$ using computing device 106. As a result, the database(s) create(s) a record for the Target having a distinct record number by which the Target will be cataloged into the system and database(s) of the present invention. This record may comprise the bibliographical information about the Target, the material constituents of the Target and the condition of those constituents as documented during the examination by an expert, and the rating results of the system of the present invention (including the Stability Rating Certificate). In an exemplary embodiment of the present invention, the records entered into the system and database(s) of the present invention will form a searchable reference source that can be accessed by the public. For example, if an "Appraiser A" uses the system of the present invention to generate a stability rating of, for example, a painting titled "Apple," that stability rating will be connected to the record created in the database for the "Apple" painting. Subsequently, should a "Buyer B" consider purchasing the "Apple" painting, "Buyer B" could search the database(s) of the system of the present invention for the "Apple" painting and determine if a stability rating has been determined for the "Apple" painting and if so, to view the information that is associated with the record for the "Apple" painting. However, access to the records that are stored in the database(s) may be limited based upon a subscriber model in which a user is provided with partial or complete access dependent upon the subscription level obtained by the user.

As discussed herein, there are many factors that can have an affect on the overall stability of art materials and works of art. TABLE 3.1 provides a non-limiting example of a list of preservation-effecting factors considered. These factors are designated as $F_x$ where x=1, 2, 3.

TABLE 3.1

| | Factors F |
|---|---|
| $F_x$ | Factor |
| $F_1$ | Type of Target |
| $F_2$ | Layer of construction |
| $F_3$ | Other preservation-effecting factors |

For each factor, $F_x$, there are multiplicities of sub-factors. For each sub-factor, there is an associated numerical grade or score. The grade reflects the significance of the potential influence of a preservation-effecting characteristic. For example, a stable material may have a higher numerical grade than an unstable material. In another example, there are many possible grades, and types of grades, but, for the example used herein, two types of grades are used. A grade can be a whole number from 0 to 100, for example, or a fraction of one (i.e., from 0 to 1, e.g. 0.2, 0.8, etc.). The final form of the standard grading system is based on the results of many types of research including literature, records, analysis, personal communications, and more.

In Step 304, the operator identifies the Target type and enters the type into the database. TABLE 3.2 provides examples of sub-factors for $F_1$, type of Target. These sub-factors are designated as $T_x$ where x=1, 2, 3, etc. A grade for each $T_x$ is also listed, $TG_x$. only one type is possible per Target.

(The grades included in the table below are only used as examples and are not actual grades.)

TABLE 3.2

| | Type T | |
|---|---|---|
| $T_x$ | Type of target object or material | Type Grade, $TG_x$ |
| $T_1$ | Painting | 1 |
| $T_2$ | Drawing | 1 |
| $T_3$ | Print | 1 |
| $T_4$ | Photograph | 1 |
| $T_5$ | Sculpture | 1 |
| $T_6$ | Material (raw, not part of an object) | 1 |

In Step 306, operator identifies the Target layers of construction. As described herein, art objects are multi-layered composites, with a minimum of one layer and without a maximum. Each layer is a sub-factor of $F_2$. These sub-factors are designated as $L_x$, where x=1, 2, 3, etc. TABLE 3.3 provides examples of $L_x$; a grade for each $L_x$ is also listed, $LG_x$. Each layer, $L_x$ in the art object is evaluated individually.

(The grades included in the table below are only used as examples and are not actual grades.)

TABLE 3.3

| | Layer L | |
|---|---|---|
| $L_x$ | Description of Layer | Layer Grade, $LG_x$ |
| $L_1$ | Auxiliary support | 1 |
| $L_2$ | Support | 1 |
| $L_3$ | Ground | 1 |
| $L_4$ | Design layer | 1 |
| $L_5$ | Surface coating | 1 |
| $L_6$ | Restoration | 1 |

For the purpose of simplifying the description, the layers listed in TABLE 3.3 (above) is an example of a typical painting. As listed in TABLE 3.3, a typical painting is comprised of several general layers. Auxiliary support ($L_1$) refers to the device that backs the material that is painted, for example, a stretcher frame. Support ($L_2$) refers to the material that is painted, for example, canvas. Ground ($L_3$) refers to a layer between the support and the upper paint layer that prepares the support for painting, for example, gesso or primer. Design layer ($L_4$) refers to the layers of paint that make the composition, in other words, the layers of paint that make the picture (and those beneath the surface but above the ground layer). Surface coating ($L_5$) refers to the uppermost layer or layers where, normally, a clear coating is applied, for example, varnish. Restoration ($L_6$) refers to materials that were added after the painting was completed, in order to repair or retouch the painting, for example. Examples of restoration are non-original paint and varnish. In this example, $L_1$ refers to auxiliary support and $L_2$ refers to support, etc. For other art objects, a painted wooden statue for example, $L_1$ may refer to support, and $L_2$ may refer to ground layer.

In Step 308, the operator identifies target materials per level in the database. As described herein, art objects are composed of multiple materials, with a minimum of one material and without a maximum. Each material is a sub-factor of $L_x$. These sub-factors are designated as $M_x$, where x=1, 2, 3, etc. TABLE 3.4 provides examples of $M_x$; a grade for each $M_x$ is also listed, $MG_x$. The examples provided in TABLE 3.4 are a fraction of the thousands of art-making materials in existence. As previously mentioned herein, virtually any and all material can be used as art material. (The grades included in the table below are only used as examples and are not actual grades.)

TABLE 3.4

| $M_x$ | Description of Material | Material Grade, $MG_x$ |
|---|---|---|
| $M_1$ | Wood, general | 85 |
| $M_2$ | Wood, Balsa | 75 |
| $M_3$ | Metal, general | 75 |
| $M_4$ | Metal, ferrous, general | 75 |
| $M_5$ | Metal, non-ferrous, general | 80 |
| $M_6$ | Steel, Brand X | 70 |
| $M_7$ | Adhesive, general | 70 |
| $M_8$ | Adhesive, polyvinyl acetate, general | 90 |
| $M_9$ | Adhesive, polyvinyl acetate, Brand X | 90 |
| $M_{10}$ | Canvas, cotton | 85 |
| $M_{11}$ | Canvas, linen | 85 |
| $M_{12}$ | Canvas, silk | 80 |
| $M_{13}$ | Primer, acrylic | 85 |
| $M_{14}$ | Primer, oil | 80 |
| $M_{15}$ | Primer, latex | 75 |
| $M_{16}$ | Paint, acrylic, water-based | 85 |
| $M_{17}$ | Paint, acrylic, water-based, Brand X | 95 |
| $M_{18}$ | Paint, oil, solvent-based, Brand Z | 90 |
| $M_{19}$ | Paint, oil, water-based | 75 |
| $M_{20}$ | Paint, watercolor | 80 |
| $M_{21}$ | Paint, watercolor, Brand X | 90 |
| $M_{22}$ | Additive, acrylic, gel | 85 |
| $M_{23}$ | Additive, acrylic, gel Brand X | 90 |
| $M_{24}$ | Additive, drier, oil-based | 65 |
| $M_{25}$ | Additive, drier, oil-based, Brand X | 70 |
| $M_{26}$ | Additive, thinner, water-based, general | 80 |
| $M_{27}$ | Additive, thinner, solvent-based, general | 80 |
| $M_{28}$ | Color, Cadmium Yellow Light, Brand X | 100 |
| $M_{29}$ | Color, Hansa Yellow, Brand X | 100 |
| $M_{30}$ | Color, Cadmium Yellow Medium Hue, Brand X | 90 |
| $M_{31}$ | Color, Nickel Azo Yellow, Brand X | 100 |
| $M_{32}$ | Color, Quinacridone Burnt Orange, Brand X | 100 |
| $M_{33}$ | Color, Diarylide Yellow, Brand X | 100 |
| $M_{34}$ | Color, Cadmium Orange, Brand X | 100 |
| $M_{35}$ | Color, Vat Orange, Brand X | 100 |
| $M_{36}$ | Color, Cadmium Red Light, Brand X | 100 |
| $M_{37}$ | Color, Pyrrole Red Light, Brand X | 100 |
| $M_{38}$ | Color, Naphthol Red Light, Brand X | 90 |
| $M_{39}$ | Color, Pyrrole Red, Brand X | 100 |
| $M_{40}$ | Color, Cadmium Red Medium, Brand X | 100 |
| $M_{41}$ | Color, Quinacridone Red Light, Brand X | 100 |
| $M_{42}$ | Color, Primary Magenta, Brand X | 100 |
| $M_{43}$ | Color, Light Magenta, Brand X | 90 |
| $M_{44}$ | Color, Naphthol Red Medium, Brand X | 90 |
| $M_{45}$ | Color, Quinacridone Red, Brand X | 100 |

TABLE 3.4-continued

| $M_x$ | Description of Material | Material Grade, $MG_x$ |
|---|---|---|
| $M_{47}$ | Color, Ultramarine Violet, Brand X | 100 |
| $M_{48}$ | Color, Dioxazine Purple, Brand X | 90 |
| $M_{49}$ | Color, Ultramarine Blue, Brand X | 100 |
| $M_{50}$ | Color, Cobalt Blue, Brand X | 100 |
| $M_{51}$ | Color, Phthalo Blue, Brand X | 100 |
| $M_{52}$ | Color, Phthalo Green, Brand X | 100 |
| $M_{53}$ | Color, Cobalt Green, Brand X | 100 |
| $M_{54}$ | Color, Chromium Oxide Green, Brand X | 100 |
| $M_{55}$ | Color, Yellow Ochre, Brand X | 100 |
| $M_{56}$ | Color, Raw Sienna, Brand X | 100 |
| $M_{57}$ | Color, Mars Yellow, Brand X | 100 |
| $M_{58}$ | Color, Red Oxide, Brand X | 100 |
| $M_{59}$ | Color, Burnt Sienna, Brand X | 100 |
| $M_{60}$ | Color, Burnt Umber, Brand X | 100 |
| $M_{61}$ | Color, Raw Umber, Brand X | 100 |
| $M_{62}$ | Color, Carbon Black, Brand X | 100 |
| $M_{63}$ | Color, Mars Black, Brand X | 100 |
| $M_{64}$ | Color, Bone Black, Brand X | 100 |
| $M_{65}$ | Color, Paynes Gray, Brand X | 100 |
| $M_{66}$ | Color, Zinc White, Brand X | 100 |
| $M_{67}$ | Color, Titanium White, Brand X | 100 |

In Step 310, the operator identifies information source(s) per material and assigns Information Reliability Grades ("IGs"). The operator uses methods of research to acquire information about the target materials. Each information source is a sub-factor of $L_x$. These sub-factors are designated as $I_x$, where x=1, 2, 3, etc. TABLE 3.5 provides examples of $I_x$; a grade for each $I_x$ is also listed, $IG_x$.

(The grades included in the table below are only used as examples and are not actual grades.)

TABLE 3.5

| $I_x$ | Description of information reliability | Info Source Grade, $IG_x$ |
|---|---|---|
| $I_1$ | APIx analytical method, ≥2 forms | 1.00 |
| $I_2$ | APIx analytical method, one form | 0.95 |
| $I_3$ | Personal communication with artist, operator or APIx | 0.80 |
| $I_4$ | Personal communication with artist, primary | 0.80 |
| $I_5$ | Personal communication with artist, ≥secondary | 0.75 |
| $I_6$ | Personal communication, gallerist | 0.70 |
| $I_7$ | Records, artist, written by artist | 0.70 |
| $I_8$ | Records, artist, written by primary | 0.70 |
| $I_9$ | Records, artist, written by ≥secondary | 0.70 |
| $I_{10}$ | Records, gallery, written by artist | 0.70 |
| $I_{11}$ | Records, gallery, written by other | 0.70 |
| $I_{12}$ | Records, collector, written by artist | 0.70 |
| $I_{13}$ | Records, collector, written by other | 0.70 |

IGs are based on the type of data available at the time of the rating. IGs are graded according to the estimated level of accuracy of the information. For example, an information source of personal communication from the artist is scored lower than an information source of documented chemical analysis. This is because of the potential lack of accuracy in the recounting of the materials and techniques from the artist versus a peer-reviewed scientific journal (for example, one that lists materials in a design layer identified through chemical analysis). In this example, the IGs are on a scale of 0 to 1, with two decimal places.

In Step 312, using the database, the computer calculates a Qualified Material Grade ("QMG") per material with equation 1:

$$QMG = \text{product of MG and IG per material} \quad (1)$$

Example $QMG_1$=product of $MG_1$ and $IG_1$ per material
$QMG_2$=product of $MG_2$ and $IG_2$ per material
... continued for each material.

The information source grade is multiplied by the material grade to get the QMG. The term qualified denotes a modifier; in this example, the information source grade is the modifier for the material grade. Therefore, the qualified material grade, QMG, is the material grade modified by the information source grade. The qualified material grade is designated as QMGx, where $MG_x = MG_1$, $MG_2$, $MG_3$, etc.

In Step 314, using the database, the computer calculates an Average Qualified Material Grade ("AQMG") per layer, $L_x$, using equation 2:

$$AQMG = \text{sum of QMG values per layer } L_x \div \text{number of QMG values in layer } L_x \quad (2)$$

Example $AQMG_1$=sum of QMG values for $L_1$÷number of MG values in $L_1$
$AQMG_2$=sum of QMG values for $L_2$÷number of MG values in $L_2$
... continued for each layer.

In Step 317, the operator identifies one condition per layer. The operator uses all methods of examination and research to evaluate the current condition of each layer. Each condition is a sub-factor of $L_x$. These sub-factors are designated as $C_x$, where x=1, 2, 3, etc. TABLE 3.6 provides examples of $C_x$; a grade for each $C_x$ is also listed, $CG_x$. (The grades included in the table below are only used as examples and are not actual grades.)

TABLE 3.6

| | Condition C | |
|---|---|---|
| $C_x$ | Description of Condition | Condition Grade, $CG_x$ |
| $C_1$ | Excellent (no color change, no deterioration products, no damage, clean) | 1 |
| $C_2$ | Very good (no color change, no deterioration products, minimal damage, slight dirt accumulation) | 0.9 |
| $C_3$ | Treated/Restored, very good (stable and reversible non-attached lining used, | 0.8 |
| $C_4$ | Good | 0.8 |
| $C_5$ | Treated/Restored, good (stable and reversible lining and materials used, stabilized) | 0.7 |
| $C_6$ | Fair | 0.7 |
| $C_7$ | Treated/Restored, fair | 0.6 |
| $C_8$ | Poor | 0.5 |
| $C_9$ | Treated/Restored, poor | 0.4 |
| $C_{10}$ | Very poor | 0.3 |
| $C_{11}$ | Treated/Restored, very poor | 0.2 |
| $C_{12}$ | Completely deteriorated | 0 |

In Step 318, using the database, the computer calculates a Qualified Layer Grade ("QLG") per layer with equation 4:

$$QLG = \text{product of AQMG and CG per layer} \quad (4)$$

In Step 320, using the database, the computer calculates an Average Qualified Layer Grade ("$AQLG_{all}$") for all layers in total using equation 5:

$$AQLG_{all} = \text{sum of QLG values} \div \text{total number of QLG values} \quad (5)$$

In Step 322, the operator identifies Other Preservation-Effecting Factors for the Target ("OG"). Each other preservation-effecting factor is a sub-factor of $F_3$. These sub-factors are designated as $O_x$, where x=1, 2, 3, etc. TABLE 3.8 provides examples of $O_x$; a grade for each $O_x$ is also listed, $OG_x$. The operator uses all methods of examination and research to evaluate the other preservation-effecting factors of the Target.
(The grades included in the table below are only used as examples and are not actual grades).

TABLE 3.8

| | Other preservation-effecting factors O | |
|---|---|---|
| $O_x$ | Type of target object or material | (OGx) |
| $O_1$ | Matting, archival | 100 |
| $O_2$ | Glazing, UV-filtering acrylic | 100 |
| $O_3$ | Hanging hardware, insufficient | 65 |
| $O_4$ | Dimensions, oversized, unsupported | 75 |
| $O_5$ | Paint application, high impasto | 75 |

In Step 324, using the database, the computer system calculates an Average Other Preservation-Effecting Factors grade ("AOG") for Target using equation 6: Eq. 6:

$$AOG = \text{sum of OG values} \div \text{total number of OG values} \quad (6)$$

In Step 326, using the database, the computer system calculates a Rating for the Target ("R") using equation 7:

$$R = (F_1G + F_2G + F_3G) \div 3 \quad (7)$$

Where:
$F_1G = TG$
$F_2G = AQLG_{all}$
$F_3G = AOG$

Figure 4:
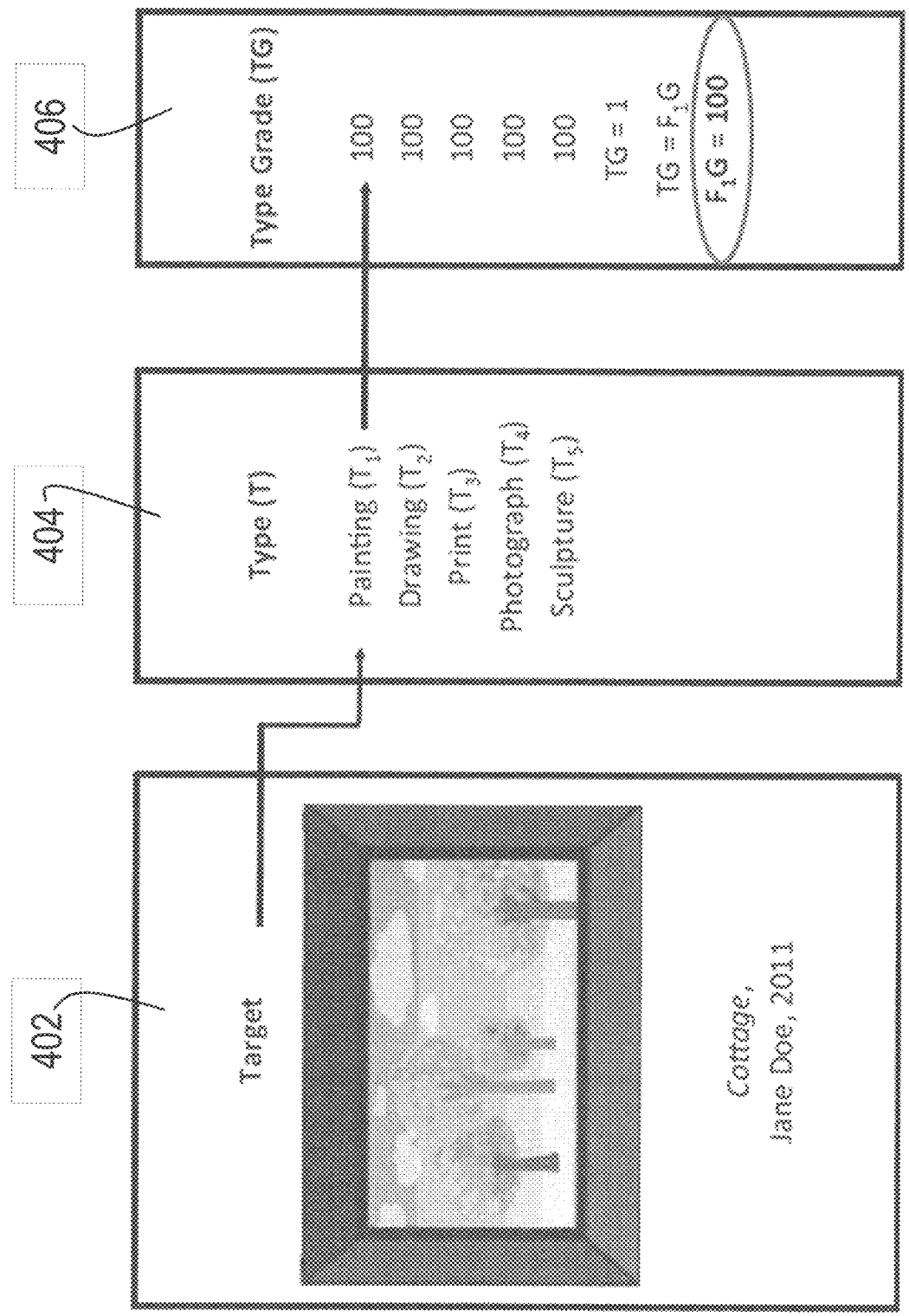
FIG. 4 is a flow chart showing an example of the system of value selection for the first set of factors in accordance with an exemplary embodiment of the system of the present invention.

FIG. 4 is a flow chart showing an example of a Target 402 and a method of selecting the Type (T) 404 and a Type Grade (TG) 406, thereby determining the value of the Factor 1 Grade ($F_1G$).

Figure 5:
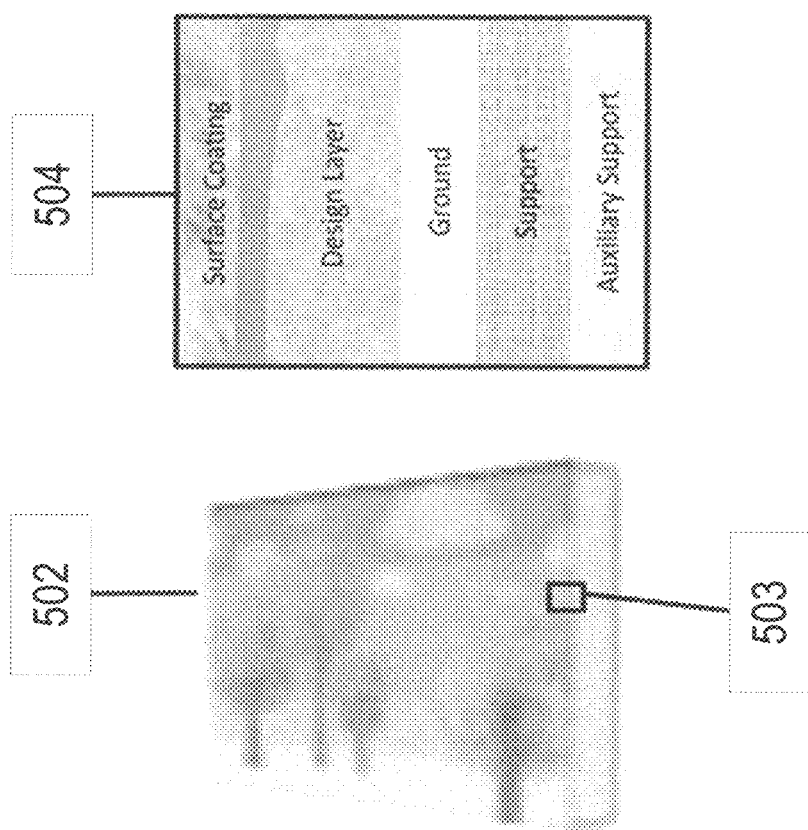
FIG. 5 is an explanatory diagram, illustrating the typical layer structure of a painting.

FIG. 5 is an explanatory diagram illustrating a typical layer structure of a painting. In FIG. 5, the Target 502 is drawn in perspective so that the edge is visible. The small black box on the edge of the painting 503 indicates the area that is enlarged in the larger black box to the right 504, with layers labeled.

Figure 6:
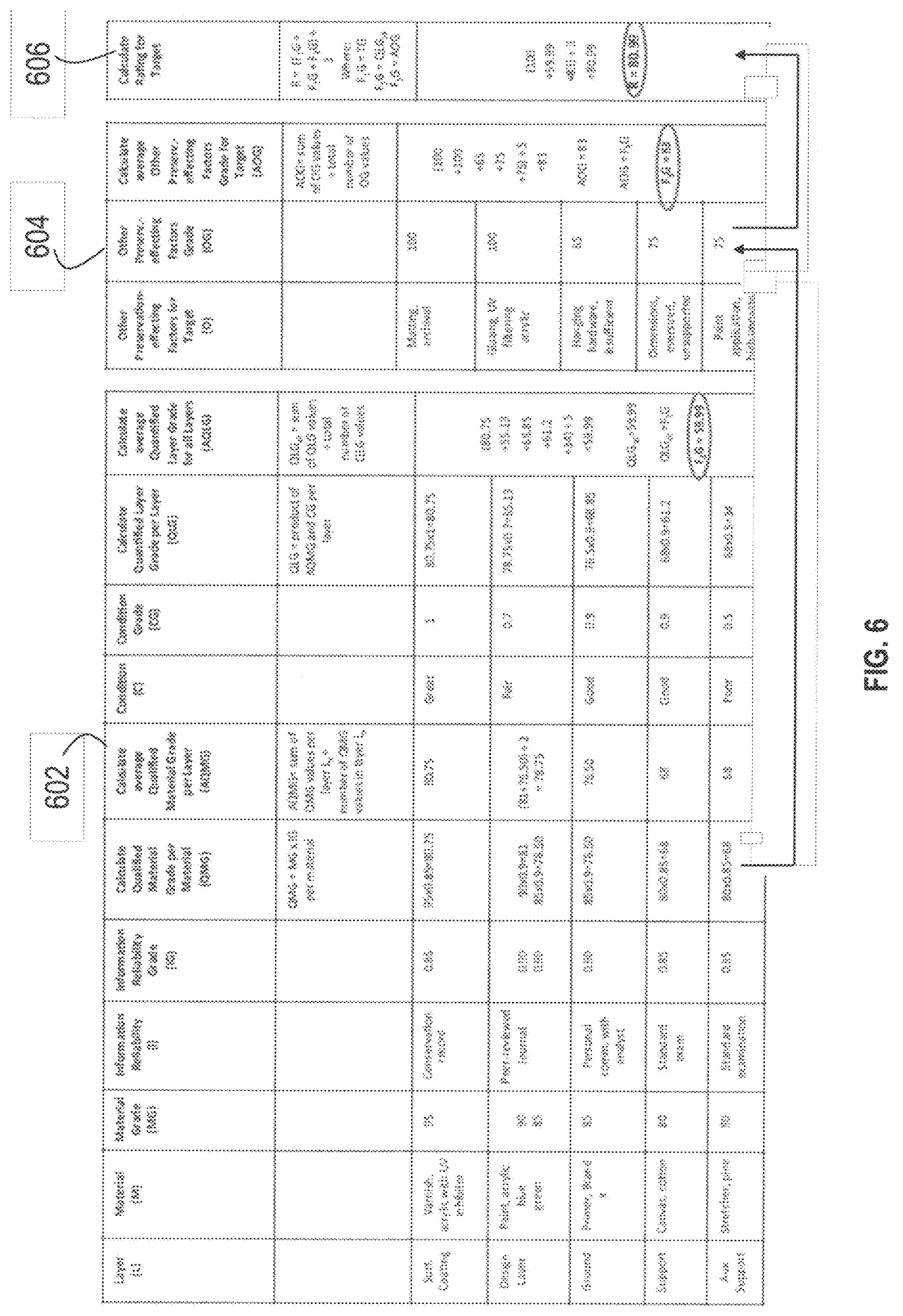

FIG. 6 is a flow chart showing the steps in an exemplary method according to the present invention for determining the Factor 2 Grade ($F_2G$) 602, Factor 3 Grade ($F_2G$) 604, and the Rating (R) 606. Equations for each are listed. Examples of calculations are listed. The section describing FIG. 3 above contains a detailed description of the equations and factors.

FIG. 3 provides just one example of the algorithmic computations that may be used to arrive at a stability rating. Other algorithmic functions are also contemplated to be within the scope of the present invention. Furthermore, in addition to the various factors, sub-factors, and grades described above with respect to each layer of the Target object, other examples of possible factors, sub-factors, and grades that may be accounted for in the algorithms and are contemplated to be within the scope of the present invention include, but are not limited to, layer types, number of layers, surface area of layers, thickness of layers, condition of layers, the material that comprises the layer, a material stability grade, a percent composition of the material, material constituent, percent composition of the constituent, a stability of constituent grade, the area of the material or constituent, number of components per target object, complexity of the object, fragility of the object, complexity of the storage of the object, complexity of the display of the object, complexity of the preservation requirements, complexity of projected conservation maintenance, the construction technique, a construction technique stability grade, the area of construction technique, the application technique, an application technique stability grade, the application technique area, material condition, types of conditions, locations of conditions, severity of each condition, surface area of each condition, a condition grade, global rating, native rating, artist rating, collection rating, standard deviation, etc.

In another exemplary embodiment of the present invention, the first in a set of ratings is the direct calculation of the stability rating or "global rating," which compares the stability rating of the Target object to the overall body of knowledge within the database(s) 108, 108$_n$ across the media or target types. Next, the data is compared to only the set of comparable parameters of that Target object to determine a "native rating." For example, a painting made of acrylic paint on canvas is compared to all other ratings for acrylic paintings in the database. Standard deviation analysis is calculated across all data sets. These calculations will compare the calculated target rating score and standard deviations to tens of thousands of pieces of data that have been accumulated in the one or more database(s) 108, 108$_n$ in order to establish an industry-wide standardized rating or degradation coefficient by statistical analysis.

In one type of algorithmic determination, data with respect to each layer, material, material constituent, application, construction technique, and condition (as well as many other variables as described above) of a Target object may be entered into the database(s) 108, 108$_n$ and compared to the overall body of knowledge already residing within the database(s) and compared to the degradation coefficient. The degradation coefficient could be defined, for example, as the stability grade multiplied by the percent composition and multiplied by the combination variable (which is the record of all times this combination has occurred and what the stability outcomes have been) related to the standard deviation. The resulting score may then be compared to all data to calculate the global rating. The resulting score may also be compared to all data in the database(s) for similar media types, all data in the database(s) related to the particular artist, all data in the database(s) related to all works in the same artwork collection, and standard deviations for each. Therefore, this particular algorithmic function uses data regression and statistical analysis to determine the ratings scales in order to increase accuracy in its results.

Accordingly, as set forth above, the wealth of data within the database(s) is dependent upon the entries of the users and therefore, the database(s) and the actual resulting scores will evolve and become more fine-tuned or accurate as operators and managers refine them over time. As a result of this rating method, a master database (i.e., the one or more database(s) 108, 108$_n$) is created for use in the processes described above, thus establishing, over time, a database that catalogues all known materials and circumstances that affect material degradation that can be useful to not only the art industry, but to other industries as well in which material degradation is a factor. The master database has sub-databases including, at least and not limited to, information about art materials such as pigments, binders, paints, varnishes, canvas, paper, wood, photographic materials, reactions between art materials, and/or references for the information about the art materials, and stores information about artists and artworks that have been previously rated. The master database will eventually contain all the information needed to perform the rating procedures explained above.

The procedure described in preceding sections is an exemplary formula for providing a rating structure of a multiplicity of preservation-effecting factors, wherein each factor is further divided into a plurality of sub-factors and each assigned a rating-affecting grade.

The following description provides several examples of mathematical models contemplated as being within the scope of the present invention, which may be utilized in the algorithmic computations to arrive at the stability rating associated with each work of art. For purposes of this description, the resulting stability value that is determined by the system of the present invention is referred to as an "Art Preservation Index", or "APIx" or "score." Throughout the explanation in this mathematical modeling section, the terms "inputs," "features," "predictors," or "variables" are considered synonymous with each other and are thusly used interchangeably. In addition, the actor or computational system conducting the evaluation of the score is referred to as an "analyst."

The score requires several inputs, which can be categorical or numeric in nature. For example, the type variable for a given work of art may place it in the "Painting" category while the condition variable of its ground layer may be rated at 94 out of a possible 100 by expert evaluation. As described in detail above, the database(s) of the system of the present invention capture all data features pertaining to the catalogued works of art. In addition to the metadata features described above, the database(s) also capture unstructured data, such as free form text describing the Target. It is from these same database(s) that the values for each variable are extracted to develop the model and/or generate stability scores.

Transformations of any and all variables may be required by the score generation process. The general goal of variable transformation is to create more convenient inputs for modeling purposes by altering the variable's distribution. These kinds of transformations include numeric procedures, such as ranking, percentiling, scaling, standard normalization, and logit transformations. For example, it may be found advantageous to convert the count of materials in a work of art to a log scale by taking the log of the original values. Textual feature transformations might also include stemming, bag-of-words, and word vectorization.

To develop some basic notation for the description here forward, the Target artwork is defined as R, and for the Target R, there exists a collection of data features, $F_R$, of length n, where $f_1$ is the first feature in the list and $f_n$ is the last. These features are, or were previously, entered into a database by one or more analysts over the life of R and are potentially subject to extraction, review and update via database query operations by the analyst. Having extracted all the desired features, the analyst applies some function, γ, to the feature set, $F_R$, to yield the stability score, $B_R$:

$$B_R = \gamma(F_R)$$

The function γ can take on several mathematical or computational forms. The description below illustrates several examples. These examples are not to be considered exhaustive; given a database of features and the variety of materials and art forms, there are potentially limitless methods that could be attempted. The examples presented below are merely intended to be illustrative of a few methods that could be potentially used.

Additive Model

In perhaps the simplest scenario, the assumption is made that all members of $F_R$ are numeric and on a continuous scale, inclusively bounded by 0 and 1. Accordingly, a negative value would not be possible for any individual feature, nor would a value greater than 1. In this scenario, the model may call for a simple mean across all features to devise the score, in which case, the function Y could be represented by:

$$\gamma(x) = \frac{1}{n}\sum_{i=1}^{n} x_i$$

Thus, when γ is applied to the feature set for Target R, the result is:

$$B_R = \gamma(F_R) = \frac{1}{n}\sum_{i=1}^{n} f_i$$

whereby $f_i$ is the ith feature in $F_R$. And so in the above example, the stability score, $B_R$, for Target R is simply the mean value of its features, $F_R$.

Multiplicative Model

Similar to the above example, it may be advantageous to express the stability function, γ, as a product of the Target's features, rather than as a weighted sum. Such a model is shown by the following expression:

$$\gamma(x) = \prod_{i=1}^{n} x_i$$

Therefore, when applying the new γ function to the feature set for Target R, the result is:

$$B_R = \gamma(F_R) = \prod_{i=1}^{n} f_i = f_1 \times f_2 \times ... \times f_n$$

Assuming that all features in $F_R$ are between 0 and 1, prudence should be taken with this method in the event that any feature approaches 0 or that a significant number of contributing features are present, as both cases would likely yield potentially artificially low scores.

Bayesian Model

An alternative method to model the stability score would be to consider the score as the conditional probability that the artwork is stable given the artwork's features and what we generally know about artworks with similar features. In such an approach, it may be advantageous to choose to apply Bayes' Rule, which states the following:

$$P(A|B) = \frac{P(B|A)P(A)}{P(B)}$$

where P(A) and P(B) are the probabilities of events A and B, respectively, and P(A|B) is the conditional probability that A is present given the presence of B, and conversely for P(B|A).

When applied to artwork stability, it is possible to evaluate the probability that the Target artwork R is stable (or the event S) given the existence of the feature set $F_R$. In this scenario, the feature set is the event upon which the stability is conditioned. And so the above equation can be rewritten:

$$P(S|F_R) = \frac{P(F_R|S)P(S)}{P(F_R)}$$

For multiple factor situations, this expression expands to the following:

$$P(S|F_R) = \frac{P(S)\prod_{i=1}^{n} P(f_i|S)}{P(S)\prod_{i=1}^{n} P(f_i|S) + P(\neg S)\prod_{i=1}^{n} P(f_i|\neg S)}$$

where $P(\neg S)=1-P(S)$, or the probability that event S is not present, and $\Pi x_i$ is the product of the sequence $x_i$ for values of i from 1 to n. To illustrate the above, if $f_1$ represents type="painting", then $p(f_1|S)$ means the probability that a work of art is a painting given that it is flagged as stable; said another way, it is the proportion of stable artworks that are paintings. One of the core tenets of Bayes Rule is the assumption of variable independence; i.e., each predictor variable has no influence on the others. In this case, all of the features $f_i$ are considered to be independent. This approach would also permit for the multi-modal feature sets (i.e., feature sets that include categoricals, numerics, etc.).

This approach also has a requirement of an awareness of the probability of stability, as well as the probability of the presence of the individual feature values. These are known as the prior probabilities and represent the current beliefs based on the existing body of evidence. This body of evidence would exist in the form of the APIx database, cataloguing thousands of artworks' stability scores against potentially millions of feature variables. And so the incorporation of such a database is essential to the ability to reference and update prior probabilities for the feature values that would be encountered in the stability evaluation process.

Expert Guided Models

There are also many approaches to the score evaluation that utilize the domain expertise of the conservators as well as the modeling expertise of the community of contributing analysts. Such models may choose to treat paintings, or acrylic paintings in a manner distinctly different from the manner in which marble sculptures are treated. Such a method might employ a collection of models and given the context of the Target artwork, select from the collection the model with the highest likelihood of accuracy given the similarity of its contextual features to those of the Target.

For example, the Target might be a watercolor from the post-impressionist period. Those contextual features might pre-select a model that applies weights learned in large proportion from artworks meeting similar contextual criteria: post-impressionism, watercolor or a combination of the two. Expressed in notation:

Let R be the Target artwork.

Let n be the number of layers in the artwork R.

Let t be the type of artwork R. Examples could be "painting", "sculpture", etc.

Let $M_i$ be a list of indicator variables for materials present in the ith layer of artwork R (1=present, 0=not present).

Let $X_i$ be the construction variables associated with materials in $M_i$. Examples may include "thin", "heavy", etc.

Let $P_i$ be a list of continuous numeric variables, representing the surface area of the layer impacted by the materials in $M_i$. These can be in terms of the proportion of the layer or as the quantity of square units covered utilizing the material.

Let $G_i$ be a list of the grades assigned to the materials of the ith layer of artwork R.

Let $S_i$ be a list of information sources providing the grades in $G_i$. Examples may include "artist interview", "APIx evaluation", "curator interview", etc.

Let $Q_i$ be a list of the quality scores associated with each information sources.

Let $C_i$ be a list of n condition scores, one score for each layer in R.

Let O be a list of variables for non-physical features associated with the artwork, pertaining to items such as storage conditions (light, temperature, humidity, etc.), caretaker history, restoration efforts, etc.

These variable declarations are merely illustrative and not meant to indicate the exhaustive list of variables or variable families potentially available. All numerical features could be subject to normalization, or "scaling", to generate transformations with similar distributions, as this is often deemed to be advantages in reducing prediction bias. All categorical variables could similarly be mapped to numerical values. Thus the output stability score, $B_R$, would be a function that can be expressed in terms of the above declarations:

$$B_R = \gamma(t, \text{layers}, M, P, G, S, X, Q, C, O)$$

The actual implementation can take several forms. A few examples are illustrated as follows:

a. Weighted Average Material Grade

In this example, the analyst chooses to evaluate the Target's stability using the features associated with the material grades, G, and the proportions of the Target's surface area, P, for all materials present in the Target. Similar to the example illustrated in the Additive Aggregate Model, this approach takes a weighted average of the material grades based on the proportion of the surface area that comprises the Target. This is achieved by taking the dot product of the vectors, G and P. Due to the existence of multiple layers, the score is then normalized by the sum of the proportion variables. Thus, in this case, the function $\gamma$ depends on two variables:

$$\gamma(x, y) = \frac{x \cdot y}{\Sigma y}$$

Applying $\gamma$ to the variables, G and P, yields the following expression for the stability score, $B_R$:

$$B_R = \gamma(G, P) = \left(\sum_{i=1}^{n} P_i\right)^{-1} \sum_{i=1}^{n} G_i^T P_i$$

b. 3-Factor Model

In this example, a weighting method is applied to the Target's features. Such a model takes on the form:

$$B_R = f^T \theta$$

where $f^T$ is the transpose of the feature vector, $F_R$, for the Target and $\theta$ is the vector of weights. A simple approach would be to apply an equal weight to each of the features; so for all values i, $\theta_i = 1/n$, where n is the length of f.

Put into practical terms, the desire is to use the variables that have already been declared to engineer features for a 3-factor model. The stability component of the artwork category ($\tau$) will have a ⅓ weight; the composition of the various layers that combine to produce the layer component ($\Lambda$) will have a ⅓ weight; finally, the average of the other factors found in O that produces the other component of the score ($\Omega$) will have a ⅓ weight. And thus, $f=[\tau, \Lambda, \Omega]$ and $\theta=[⅓, ⅓, ⅓]$. These factors and weights are intended to merely be illustrative of a method that might be employed. The actual factors and associated weights may differ materially from those presented here, both in number, value and/or composition.

To arrive at the various components of the stability score, there is performed light feature engineering. $\tau$ is mapped directly to a numeric variable, depending on the type of artwork. For the layer component, $\Lambda$, the proportion, grade, quality and construction variables are multiplied together for each material present in each layer. These component scores then are summed by layer. The proportion variable provides a means of weighting the materials based on the relative contribution to the overall layer's construction. These individual layer scores are then averaged to generate $\Lambda$. $\Omega$ is generated by taking the average of all the "other" factors. The following is a basic pseudo-code to illustrate how this might appear in a computational framework:

```
1    // Declaration of a function to generate the APIx score based on
2    // three factors: type, layers composition, and other factors.
3    // Reference the above variable declarations for descriptions.
4    //
5    def f(t, layers, M, P, G, S, X, Q, C, O):
6        if t = "painting":
7            τ=0.9;
8        else:
9            τ=0.7
10       λ = [ ]
11       for i in 1:length(layers):
12           λ[i] =sum(M[i]*P[i]*G[i]*Q[i]*X[i])
13       Λ = λ•C/length(λ)
14       Ω = sum(O)/length(O)
15       total_score = (τ + Λ +Ω) / 3
16       return total_score
```

Machine Learning Models

It may be advantageous to utilize more computational power and train the scoring model with limited impositions of domain expertise beyond the derivation of the features themselves. A subdomain of artificial intelligence, called machine learning, provides facilities for analysts to train models based on a corpus of known examples, referred to as "training samples" for the purpose of predicting variables for unknown examples. Given the APIx database(s), it is possible to train such a model using the thousands of catalogued artworks as training samples to estimate the stability score for a new Target. Problems that fit into the machine learning paradigm are typically categorized as either regression problems—where the objective is to estimate the value of the sample's target variable—or classification problems—where the objective is to predict the sample's class. Here are a few examples employed in regression and classification problems. This is by no means an exhaustive survey of the available algorithms. This section merely intends to illustrate machine learning methods that may be utilized to calibrate model parameters.

a. Linear Regression Model

Given a database of features with known continuous values for the stability scores for thousands of artworks, it is possible to treat the stability score as the output of a predictive modeling exercise, with the objective of making the best estimate of the target variable—the stability score—given the collection of features and the learned weights, or parameters, associated with each feature. A method for estimating these parameters is by fitting a linear model of the form:

$$y = x^T \theta$$

$$y = \sum_{i=1}^{p} x_i^T \theta_i$$

where y is the target variable, θ is the vector of parameters (or weights) of length p and x is the feature vector of length p. θ is learned from the training on known values of the y variable and a m-x-p matrix of features, X, where m is the number of training samples and p is the number of features per training sample. The model is fit based on the minimization of a loss function, for example:

$$L(x) = \sum_{i=1}^{n} (y_i - x_i^T \theta_i)^2$$

This loss function is known as Ordinary Least Squares (OLS). Its parabolic qualities provide its ability to be minimized globally. Given the above expression for the OLS loss, the expression for the estimated parameters, $\hat{\theta}$, reduces to matrix notation by taking the first derivative with respect to θ:

$$\hat{\theta} = \min_{\theta} \sum_{i=1}^{n} (y_i - x_i^T \theta_i)^2$$

$$\hat{\theta} = (X^T X)^{-1} X^T y$$

where $X^T$ is the transpose of X, and $(X^T X)^{-1}$ is the inverse of the p-by-p square matrix, $X^T X$. For large quantities of training samples, such calculations would only reasonably be done with computational device resources. It would be reasonable to assume that APIx will be training models using a computational framework.

b. Logistic Regression Model

Rather than estimating a score, it may be advantageous to treat the problem as one of classification, wherein the target variable takes on the values 0 or 1, with 1 representing the event that the artwork is stable. Similar to the Linear Regression model explained above, the logistic regression uses a linear fit to estimate parameters θ based on the training samples' features, X. The primary difference is that logistic regression models are used to predict a continuous value on the interval from 0 to 1, representing the probability of stability given the sample's features, or p(y=1|x). To fit the parameters θ, the linear model is transformed using the logistic function:

$$p(X) = \frac{e^{\theta \cdot X}}{1 + e^{\theta \cdot X}}$$

This expression can be manipulated to represent the odds:

$$\frac{p(X)}{1 - p(X)} = e^{\theta \cdot X}$$

Taking this one step further, the log of both sides of the odds expression can be taken to arrive at the log-odds, yielding the linear form of the parameters θ and X shown in Linear Regression:

$$\log\left(\frac{p(X)}{1 + p(X)}\right) = \theta \cdot X$$

At this point, a computational optimization approach is employed to arrive at parameter estimates for θ that maximize the likelihood of the model accurately predicting a sample's belonging to one of the binary stability classes, S=0 or S=1, where S=1 is the event that the target is stable.

c. Random Forest Model

Similar to the Bayesian or Logistic Regression models, it may be advantageous to model the stability of the artwork as the output of a classification system, where the outcome variable, $y_R$, is the maximum likelihood of the stability class variable given the features, $X_R$. Using this approach to classification problems, a collection of decision tree-based classifiers are trained, each with a limited subset of training features used to classify the target and based on a bootstrapped training set (i.e., the training set of each classifier is equal in size to the overall training set). The outputs of the classifiers are averaged to produce the prediction for the target.

In order to model the APIx, it is necessary to have access to database(s) wherein it is possible to extract a training set of catalogued artworks with known features and stability classes. These may or may not be filtered based on macro factors such as the type of artwork, the period, or the artist. Compositional features would then be collected for the target artwork and entered into the database. In this example case, the analyst may have a collection of 60 features to represent each of the artworks in training as well as in the target (Note: "60" is merely illustrative; the actual number of features utilized by the analyst could be significantly more or less than 60).

A value is chosen for m, or the number of predictors to be used in each classifier, where m≤60. For example, the number 8 may be chosen (Note: "8" is merely illustrative; the actual number of features per classifier utilized by the analyst could be significantly more or fewer than 8 and will be probably be optimized during the analyst's cross-validation procedures).

A value is chosen for n, or the number of trees to be utilized, equal to 1000 (Note: "1000" is merely illustrative; the actual number of trees utilized by the analyst could be significantly more or fewer than 1000 and will likely be optimized during the analyst's cross-validation procedures).

Rather than a binary variable, in this case, the analyst may be trying to predict a multi-class variable capable of taking on the values "A", "B", "C", "D", and "F". (Note: the selection of 5 potential classes is arbitrary. The APIx may have significantly more or fewer target classes).

The model is then trained. It may be advantageous to hold out a portion of the training samples for cross-validation. It may also be advantageous to evaluate the performance of the model and tune the parameters according to a grid search. Such analysis pipelines can be applied to most machine learning algorithms; this example is merely intended to be illustrative of an approach where there is access to the APIx database(s).

Due to Random Forest's, as well as several other machine learning algorithms, dependence on 100 s-1000 s of computational iterations of random samples, a computational framework using a programmable computing device would certainly be required given the expected size of the APIx database(s). Other algorithms with similar computational requirements include Support Vector Machines, Gradient Boosting, and Neural/Deep Learning Networks.

Example Data Model

The following is a description of how the underlying data storage might materialize in the APIx database(s). This is a single example, demonstrating select metadata features as well as material compositional features relevant to the invention. Accordingly, this is by no means an exhaustive representation of what the features might comprise a record; the APIx database(s) contain thousands of records, each of which contains potentially thousands of features of varying modality and structure. Therefore, the below is merely illustrative of what one such record may look like.

```
R: {
  id: 1234567,
  stability_history: {
    stability: {
      date: ,
      score: ,
      technician_id: ,
      features: ,
      model_version:
    }
  },
  metadata: {
    type: "painting",
    medium: "Oil",
    artist: "Pablo Picasso",
    date: 1931,
    title: "...",
    ...,
  },
  Layers: {
    support: {
      materials: {
        material: {
          label: "canvas",
          grade: 0.98,
          information: {
            score: 0.9,
            source: "APIx examination"
          },
          submaterials: {
            submaterial: {
              label:,
              grade:,
              information: {
                score:,
                source:
              }
            },
```
```
            submaterial: {
              label:,
              grade:,
              information: {
                score:,
                source:
              }
            }
          },
          material: {
            label: "red oak",
            grade: 0.8,
            information: {
              score: 0.9,
              label: "APIx examination"
            }
          },
        },
        condition: {
          label: "very good",
          score: 0.9,
          information: {
            score: 0.9,
            label: "APIx examination"
          }
        }
      },
      ground: {
        materials: {
          material: {
            label: "primer",
            grade: 0.9,
            information: {
              score: 0.9,
              label: "APIx examination"
            }
          }
        }
      },
    },
    Other: {
      Storage_history: {
        period: {
          start_date: 2001-01-01,
          end_date: 2014-12-15,
          climate_control: True,
          light_control: True,
          ...
        },
        period: {
          start_date: 2014-12-15,
          end_date: NULL,
          ...
        }
      },
      Restoration_history: {
        restoration: {
          start_date: ,
          end_date:,
          activity:,
          layers_impacted:,
          ...
        }
      },
      Caretaker_history: {
        caretaker: {
          start_date:,
          end_date:,
          name:,
          address:,
          ...
        }
      },
      ...
    }
}
```

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for determining a predictive stability rating of a subject artwork piece, comprising:
a network communicatively coupled to at least one server;
at least one central database communicatively coupled to the network and comprising data regarding a plurality of preservation-effecting factors and sub-factors relevant to the stability of artwork and relating the preservation-effecting factors and sub-factors to a plurality of artwork pieces not limited to a particular artist, and forming a computer-searchable catalog of stored records with each record being associated with a specific artwork piece and comprising data pertaining to at least physical characteristics of the specific artwork piece and an associated stability rating;
at least one computing device comprising:
a network interface communicatively coupled to the network and configured to transmit and receive data over the network; and
an application having a graphical user interface through which user-operations are performed, wherein the application is configured to receive from a user through the graphical user interface data in real time from the user's clinical examination of, and research about, the subject artwork piece, and to transmit the received data over the network, wherein:
the data received from the user comprises at least one photographic image and physical dimensions of the subject artwork piece; and
the application is configured to:
convert the photographic image into a digital image and, based upon the physical dimensions of the subject artwork piece, generate a grid underlay of the digital image viewable in the graphical user interface, wherein the grid underlay is comprised of a number of cells, each cell representing a percentage of the surface area of the subject artwork piece;
translate selected cells of the grid underlay into data points pertaining to physical conditions of material constituents of the subject artwork piece, wherein the selected cells are selected by the user by using the graphical user interface to select a condition type from a plurality of selectable condition types and then to select the cells of the grid underlay that correspond to a physical location of the subject artwork piece where the selected condition type is present; and
transmit the resulting data points over the network; and
wherein the at least one server is configured to:
create a record in the at least one central database uniquely associated with the subject artwork piece and store in the record the data received from the user; and
apply to the data in the record a computer-learned analytical model to determine with respect to the subject artwork piece:
a representative grade for each preservation-effecting factor and sub-factor, wherein each representative grade is weighted based upon the influence of the preservation-effecting factor or sub-factor on the stability of an artwork piece as dynamically learned by the computer-learned analytical model from the body of data stored in the at least one central database; and
the stability rating representative of the projected stability of the subject artwork piece based upon the representative grades, wherein:
the computer-learned analytical model is trained according to principles of machine learning; and
the computer-learned analytical model interrelates the grades and the stability rating with the body of data stored in the at least one computer database such that a change in the data stored in the computer database may dynamically alter the resulting grades and stability rating.

2. The system according to claim 1, wherein the data received from the user about the subject artwork piece is in response to a series of prompts generated by the application.

3. The system according to claim 1, wherein the data received from the user about the subject artwork piece pertains to:
material constituents; and
a physical condition of the material constituents.

4. The system according to claim 1, wherein the data received from the user about the subject artwork piece identifies:
an artwork type;
one or more layers of construction;
materials comprising the one or more layers of construction; and
a current condition of each of the one or more layers of construction.

5. The system according to claim 1, wherein the stability rating is in alphanumeric form.

6. The system according to claim 1, wherein the network interface of the at least one computing device is wirelessly coupled to the network.

7. The system according to claim 1, wherein the at least one computer database is stored in the at least one computing device.

8. The system according to claim 1, wherein the clinical examination of the subject artwork piece is performed using non-invasive and/or invasive tools of examination.

* * * * *